United States Patent
Goyal et al.

(10) Patent No.: US 12,423,592 B2
(45) Date of Patent: Sep. 23, 2025

(54) HIERARCHY-PRESERVING LEARNING FOR MULTI-LABEL CLASSIFICATION

(71) Applicant: Samsung Electronics Company, Ltd., Suwon Si (KR)

(72) Inventors: Palash Goyal, San Jose, CA (US); Divya Choudhary, Santa Clara, CA (US); Saurabh Sahu, San Bruno, CA (US); Shalini Ghosh, Menlo Park, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1206 days.

(21) Appl. No.: 17/192,761

(22) Filed: Mar. 4, 2021

(65) Prior Publication Data

US 2021/0279525 A1    Sep. 9, 2021

Related U.S. Application Data

(60) Provisional application No. 63/143,373, filed on Jan. 29, 2021, provisional application No. 62/985,573, filed on Mar. 5, 2020.

(51) Int. Cl.
*G06N 5/022* (2023.01)
*G06F 18/21* (2023.01)
(Continued)

(52) U.S. Cl.
CPC ........... *G06N 5/022* (2013.01); *G06F 18/214* (2023.01); *G06F 18/217* (2023.01);
(Continued)

(58) Field of Classification Search
CPC ................. G06F 18/214; G06F 18/217; G06F 18/2431; G06F 18/24323; G06N 20/00;
(Continued)

(56) References Cited

U.S. PATENT DOCUMENTS

2017/0039471 A1 *   2/2017   Ogawa .................... G06N 3/08

OTHER PUBLICATIONS

Lyu et al., "Curriculum Loss: Robust Learning and Generalization Against Label Corruption", Feb. 21, 2020, arXiv:1905.10045v3, pp. 1-22. (Year: 2020).*
Zeng et al., "Hierarchical Multi-Label Classification over Ticket Data using Contextual Loss", May 9, 2014, 2014 IEEE Network Operations and Management Symposium (NOMS), pp. 1-8. (Year: 2014).*

(Continued)

*Primary Examiner* — Brent Johnston Hoover

(57) ABSTRACT

A method implemented by one or more computing systems includes accessing a set of content objects, in which each content object of the set of content objects is pre-labeled with concepts of a plurality of concepts organized according to a hierarchical relationship. The method further includes training, by a machine-learning model, a classification model for classifying content objects within the set of content objects. Training the classification model includes determining, for each object, a plurality of classification values corresponding to the plurality of concepts, calculating a loss for each of the plurality of classification values based on the pre-labeled concepts associated with the object, utilizing a hierarchical constraint loss function to calculate a maximum loss based on the calculated loss for each of the plurality of classification values, and updating the classification model based on the hierarchical constraint loss function until the maximum loss satisfies a predetermined criterion.

20 Claims, 9 Drawing Sheets

(51) Int. Cl.
G06F 18/214 (2023.01)
G06F 18/2431 (2023.01)
G06N 20/00 (2019.01)
G06V 10/764 (2022.01)
G06V 10/774 (2022.01)
G06V 10/776 (2022.01)

(52) U.S. Cl.
CPC ......... *G06F 18/2431* (2023.01); *G06N 20/00* (2019.01); *G06V 10/764* (2022.01); *G06V 10/774* (2022.01); *G06V 10/776* (2022.01)

(58) Field of Classification Search
CPC .... G06N 5/022; G06V 10/764; G06V 10/774; G06V 10/776
See application file for complete search history.

(56) References Cited

OTHER PUBLICATIONS

Bertinetto, Luca, Romain Mueller, Konstantinos Tertikas, Sina Samangooei, and Nicholas A. Lord. "Making better mistakes: Leveraging class hierarchies with deep networks." In Proceedings of the IEEE/CVF Conference on Computer Vision and Pattern Recognition, pp. 12506-12515, Jun. 12, 2020.

Wehrmann, Jonatas, Ricardo Cerri, and Rodrigo Barros. "Hierarchical multi-label classification networks." In International Conference on Machine Learning, pp. 5075-5084. PMLR, Jul. 3, 2018.

Lyu, Yueming, and Ivor W. Tsang. "Curriculum loss: Robust learning and generalization against label corruption." arXiv preprint arXiv:1905.10045, May 24, 2019.

* cited by examiner

HIERARCHY-PRESERVING LEARNING FOR MULTI-LABEL CLASSIFICATION

PRIORITY

This application claims the benefit under 35 U.S.C. § 119(e) of U.S. Provisional Patent Application No. 62/985,573, filed 5 Mar. 2020, and U.S. Provisional Patent Application No. 63/143,373, filed 29 Jan. 2021, which are incorporated herein by reference.

TECHNICAL FIELD

This disclosure relates generally to database and file management within network environments, and in particular relates to hierarchical constraint loss functions for multi-label classification.

BACKGROUND

Machine learning (ML) models are trained on class labels that often have an underlying taxonomy or hierarchy defined over the label space. For example, a set of images may contain objects like "building" and "bulldog". There exists a class/subclass relation between "dog" and "bulldog" so, if the model predicts the object to be a dog instead of bulldog, a human evaluator will consider the error to be mild. In comparison, if the model predicts the same object to be "stone" or "car", then the error will be more egregious. Although such nuances are often not visible through standard evaluation metrics, they are important in real deployments of ML models. Hierarchical multi-label classification (HMC) methods, which utilize the hierarchy of class labels, aim to tackle the above issue. Traditional methods in this domain broadly use one of three approaches: (i) architectural modifications to the original model to learn either levels or individual classes separately, (ii) converting the discrete label space to a continuous one and embedding the labels using relations between them, and (iii) modifying the loss function by adding more weights to specific classes in the hierarchy. However, the methods in this domain are mostly empirical and the choice of modifications is often experimental.

DESCRIPTION OF EXAMPLE EMBODIMENTS

Figure 1:
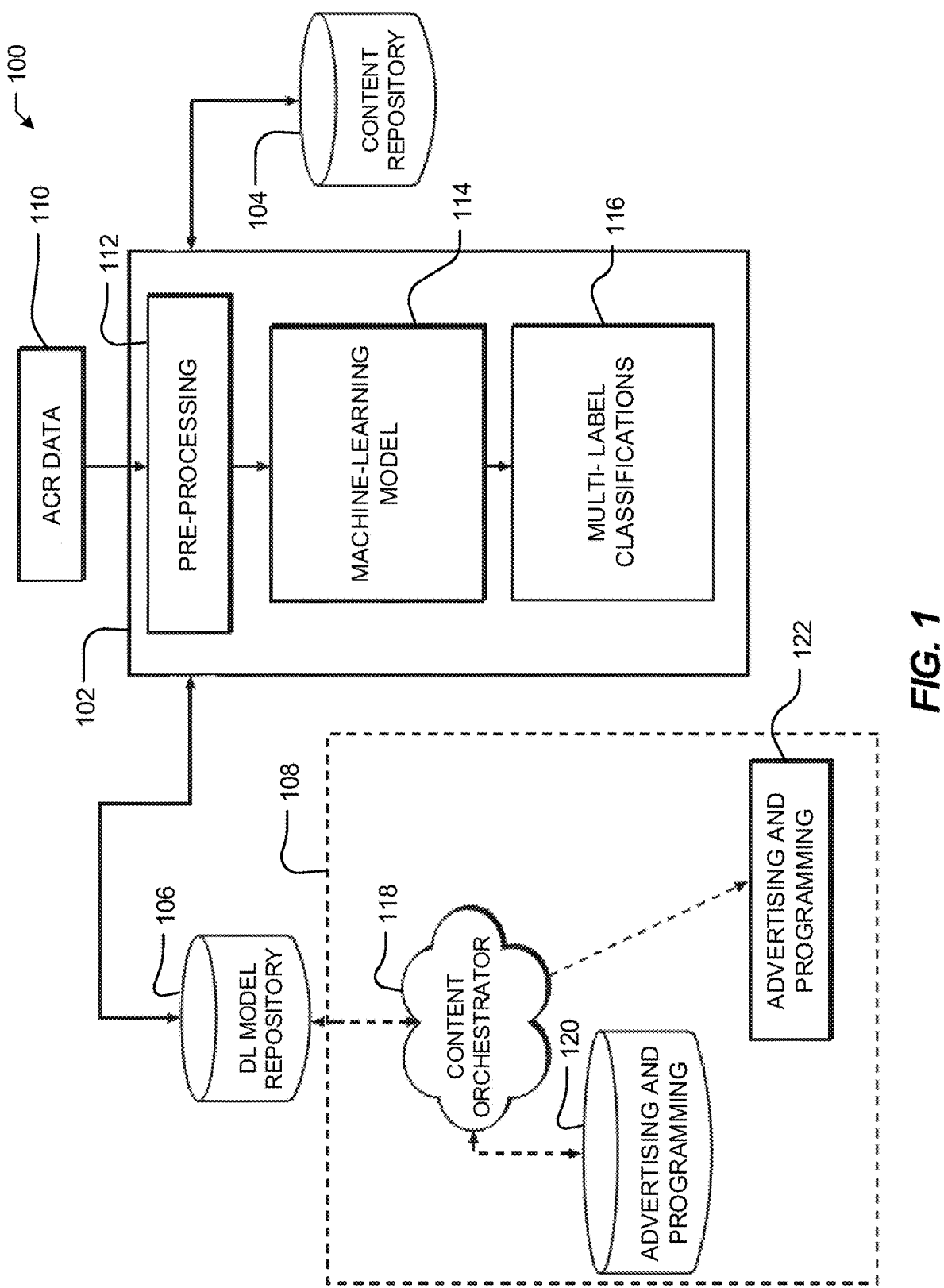
FIG. 1 illustrates an example multi-label classification prediction system.

The present embodiments are directed toward a programming analytics system for deriving and utilizing a hierarchical constraint loss function for training a machine-learning model to more accurately predict multi-label classifications. The programming analytics system may access a set of content objects, in which each content object of the set of content objects may be pre-labeled with one or more concepts of a number of concepts. In particular embodiments, the number of concepts may be organized according to a hierarchical relationship. In particular embodiments, the programming analytics system may train, by a machine-learning model, a classification model for classifying content objects within the set of content objects. For example, in particular embodiments, training, by the machine-learning model, the classification model may include training the classification model utilizing content objects of the set of content objects corresponding to the parent concept in accordance with a predetermined criteria prior to utilizing content objects of the set of content objects corresponding to the child concept in accordance with the predetermined criteria.

In particular embodiments, training the classification model may include determining, for each object, a number of classification values corresponding to the plurality of concepts. In particular embodiments, training the classification model may further include calculating a loss for each of the plurality of classification values based on the pre-labeled concepts associated with the object. For example, in particular embodiments, the calculated loss for each of the number of classification value may include a first calculated loss for a parent concept of the number of concepts and a second calculated loss for a child concept of the number of concepts. In particular embodiments, training the classification model may further include utilizing a hierarchical constraint loss function to calculate a maximum loss based on the calculated loss for each of the plurality of classification values. For example, in particular embodiments, the hierarchical constraint loss function may include one or more constraints configured to limit the second calculated loss to a value less than or equal to that of the first calculated loss. In particular embodiments, the hierarchical constraint loss function may also be tightly bounded around 0-1 loss function. In particular embodiments, prior to utilizing the hierarchical constraint loss function to calculate the maximum loss, the programming analytics system may derive the hierarchical constraint loss function based on one or more base loss functions.

In particular embodiments, subsequent to deriving the hierarchical constraint loss function, the programming analytics system may sort the respective losses for each of the number of classification values in order of increasing loss value and selecting an initial K concepts corresponding to an initial K losses of the sorted respective losses, such that a cumulative sum of the initial K losses is greater than a sum of a predetermined threshold loss value and 1−K. For example, in particular embodiments, K may include a hyperparameter. In particular embodiments, training the classification model may conclude with utilizing updating the classification model based on the hierarchical constraint loss function until the maximum loss satisfies a predetermined criterion. In this way, the present embodiments may provide a hierarchical constraint loss function, which may be utilize, for example, to improve programming content recommendations (e.g., TV programming, video-streaming programming, podcast programming, and so forth) and advertisements (e.g., advertisements that may be interesting to particular users) by suggesting programming content to user based on the current video and user's watch history/profile, providing more coarsely grained programming content categories (e.g., Action, Entertainment), providing more finely grained categories (e.g., Entertainment/Concert, Action/War) can increase accuracy of recommendation, providing better advertisement targeting based on users' watch history or taste graphs, and so forth.

An example multi-label classification prediction system 100 is illustrated by FIG. 1. As depicted by FIG. 1, the multi-label demographics classification prediction system 100 may include a programming analytics system 102, one or more databases 104, 106, and a TV programming and advertising content subnetwork 108. In particular embodiments, the programming analytics system 102 may include a cloud-based cluster computing architecture or other similar computing architecture that may receive one or more user automatic content recognition (ACR) user viewing data 110, which may be provided by first-party or third-party sources, and provide TV programming content and advertising content to one or more client devices (e.g., a TV, a standalone monitor, a desktop computer, a laptop computer, a tablet computer, a mobile phone, a wearable electronic device, a voice-controlled personal assistant device, an automotive display, a gaming system, an appliance, or other similar multimedia electronic device) suitable for displaying programming and advertising content and/or playing back programming and advertising content. Additionally, the programming analytics system 102 may be utilized to process and manage various analytics and/or data intelligence such as TV programming analytics, web analytics, user profile data, user payment data, user privacy preferences, and so forth. For example, in particular embodiments, the programming analytics system 102 may include a Platform as a Service (PaaS) architecture, a Software as a Service (SaaS) architecture, and an Infrastructure as a Service (IaaS), or other various cloud-based cluster computing architectures.

In particular embodiments, as further depicted by FIG. 1, the programming analytics system 102 may include a pre-processing functional block 112, a machine-learning model functional block 114, and multi-label classification functional block 116. In particular embodiments, the pre-processing functional block 112, the machine-learning model functional block 114, and the multi-label classification functional block 116 may each include, for example, a computing engine. In particular embodiments, the pre-processing functional block 112 may receive the ACR user viewing data 110, which may include, for example, specific programming content (e.g., TV programming) recently viewed by one or more particular users or subgroups of users. For example, the ACR user viewing data 110 may include an identification of the recently viewed programming content (e.g., TV programs), metadata associated with the recently viewed programming content (e.g., TV programs), the particular timeslot (e.g., day-hour) the recently viewed programming content (e.g., TV programs) was viewed within, and the programming channel on which the programming content (e.g., TV programs) was viewed.

In particular embodiments, the pre-processing functional block 112 may then interface with the content database 104 to associate the recently viewed programming content included in the ACR user viewing data 110 with TV programming content stored by the database 104. For example, the TV programming content stored by the database 104 may include, for example, user or subgroup profile data, programming genre data, programing category data, programming clustering category group data, or other TV programming content or metadata that may be stored by the database 104. In particular embodiments, the ACR user viewing data 110 may include time-series data expressed in an hour context and/or day context. For instance, in a particular embodiment, time-series ACR user viewing data 110 may be received, for example, every 2-hour timeslot per 24-hour time period (12 timeslots total per 24-hour day). In some embodiments, different timeslots may be utilized (e.g., 8 3-hour timeslots per 24-hour time period, 24 1-hour timeslots per 24-hour time period, 48 30-minute timeslots per 24-hour time period, and so forth).

In particular embodiments, the machine-learning model functional block 114 may include a hierarchical constraint loss function that may be utilized to ensure that the machine-learning model functional block 114 predicts parent classification labels with a higher probability than that of child classification labels. For example, in accordance with the presently disclosed embodiments, a set of content objects (e.g., images, video, audio, audible content, and so forth) may contain objects, such "building" and "bulldog". In particular embodiments, because there is a hierarchical relationship (e.g., class-subclass relation) between "dog" and "bulldog", for example, the machine-learning model functional block 114, through the hierarchical constraint loss function, may be trained and retrained to always predict "dog" with a higher probability than the machine-learning model functional block 114 predicts "bulldog". In particular embodiments, as further illustrated by FIG. 1, the programming analytics system 102 may provide the predictions of hierarchical multi-label classifications to the database 106. In particular embodiments, as further depicted by FIG. 1, a network-based content orchestrator 118 may retrieve the predictions of the hierarchical multi-label classifications from the database 106. The content orchestrator 118 may then store the predictions of the hierarchical multi-label classifications together with TV programming and advertising content to be viewed in a programming and advertising content base 120. In particular embodiments, based on the predictions of the hierarchical multi-label classifications, the content orchestrator 118 may then provide TV programming and advertising content 122 to, for example, an end-user client device for user viewing.

Figure 2A:
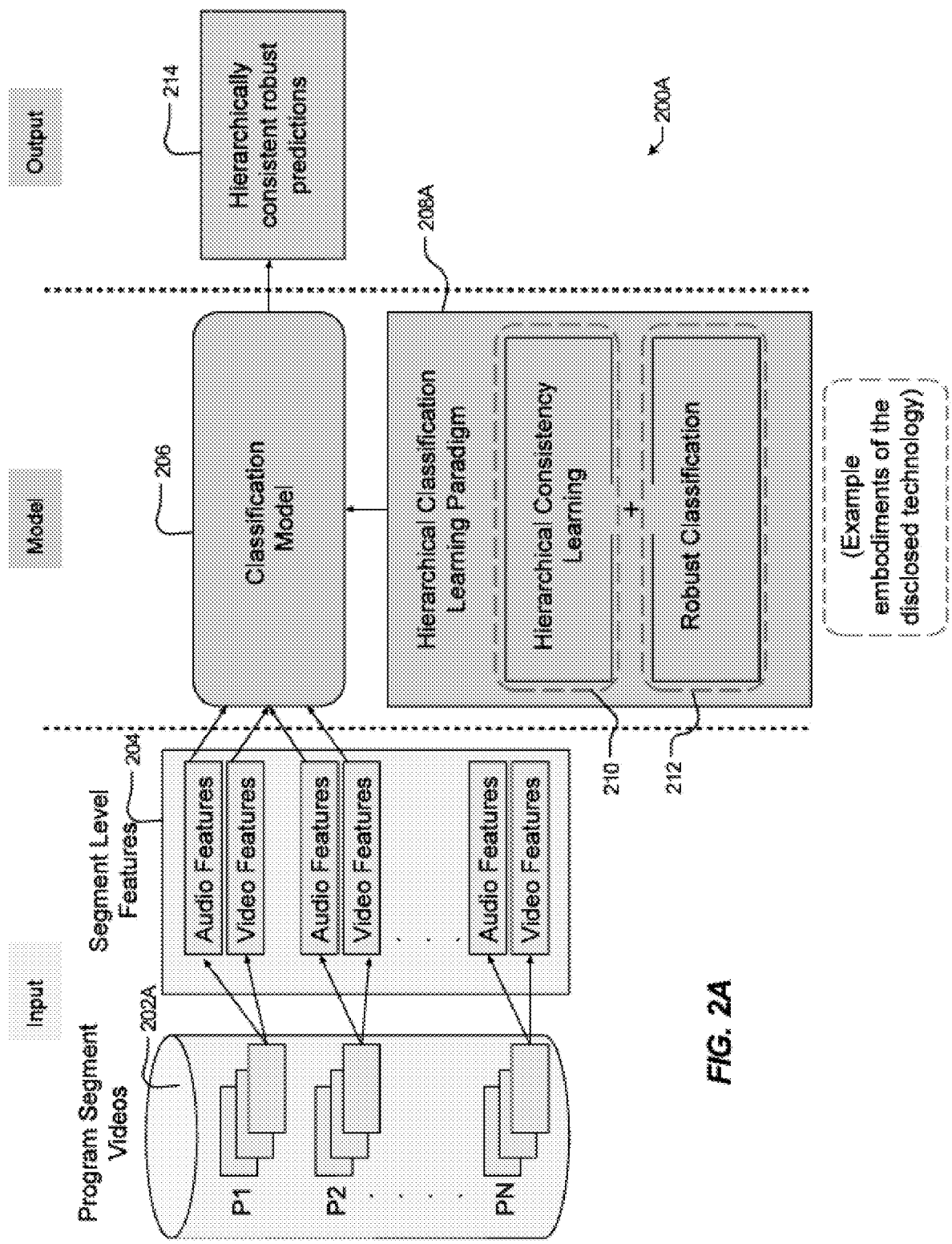
FIG. 2A illustrates a multi-label classification machine-learning model for deriving and utilizing a hierarchical constraint loss function for training a machine-learning model.

FIG. 2A illustrates a multi-label classification machine-learning model 200A for deriving and utilizing a hierarchical constraint loss function for training a machine-learning model to more accurately predict multi-label classifications. In accordance with the presently disclosed embodiments, the multi-label classification model 200A learns by making hierarchically consistent, robust, and more accurate predictions of multi-label classifications. As depicted, the multi-label classification model 200A may include a database of programing content objects 202A (e.g., TV programming, video-streaming programming, podcast programming, and so forth), which may include, for example, sets of images, videos, audio, audible content, and so forth. In particular embodiments, one or more segmented object features 204 may be extracted from the programing content objects 202A. In particular embodiments, the one or more segmented object features 204 may be inputted to a multi-label classification model 206A for classifying content objects that may be included within the programing content objects 202A (e.g., TV programming, video-streaming programming, podcast programming, and so forth). In particular embodiments, the multi-label classification machine-learning model 200A may also include a hierarchical classification learning model 208 that may be programmatically coupled to the multi-label classification model 200A. In particular embodiments, the hierarchical classification learning model 208 may include a hierarchical consistency learning functional block 210 and a robust classification functional block 212.

In particular embodiments, a base multi-label loss function, which may be expressed as:

$$l(y, \hat{y}) = \sum_{j \in \mathbb{N}} \sum_{j \in \mathbb{C}} l(y_{i,j}, \hat{y}_{i,j}). \quad \text{(Equation 1)}$$

In particular embodiments, Equation 1 may be lower bounded by 0-1 loss, but may not impose any hierarchical constraints between the categories. In particular embodiments, because of no hierarchical constraint this loss might give higher probability to a "Dog" than "Animal" in case a sample is labeled as both "Animal" and "Dog". In particular embodiments, this may imply that the multi-label classification model 206A is more accurate in its prediction of "Dog" as compared to "Animal". However, as may be appreciated, such an implication may be counterintuitive as "Dog" is an "Animal" and thus its probability should not be greater than that of "Animal". Accordingly, in particular embodiments, the multi-label classification machine-learning model 200A may utilize the base multi-label loss function to derive a hierarchical constraint loss function based on one or more constraints, which may be expressed as:

$$\Lambda : \forall x_i, y_i) \in \mathcal{T}, \forall c_1, c_2 \in \mathbb{C}, \mathbb{P}(c_1) = c_2 \Longrightarrow l(y_{i,c_1}, \hat{y}_{i,c_1}) \geq l(y_{2,c_2}, \hat{y}_{i,c_2}) \quad \text{(Equation 2).}$$

In particular embodiments, based on the base multi-label loss function (e.g., Equation 1) and the one or more constraints (e.g., Equation 2), the multi-label classification machine-learning model 200A may derive a hierarchical constraint loss function, which may be expressed as:

$$l_h(y, \hat{y}) = \sum_{j \in \mathbb{N}} \sum_{j \in \mathbb{C}} \max(l(y_{i,j}, \hat{y}_{i,j}), l(y_{i,\mathbb{P}(j)}, \hat{y}_{i,\mathbb{P}(j)})). \quad \text{(Equation 3)}$$

In particular embodiments, the hierarchical constraint loss function as expressed in Equation 2 may ensure that the higher classes (e.g., parent classes) in the hierarchy with respect to other classes (e.g., child classes) are selected to provide training samples until the multi-label classification model 206A learns to accurately identify and classify the parent classes before providing training samples for child classes higher in the hierarchy. For example, in particular embodiments, the hierarchical constraint loss function (e.g., Equation 3) guarantees that the loss of a child class (e.g., "Dog") may always be more than the one or more corresponding losses of an intermediate class (e.g., "Canine") and parent class (e.g., "Animal"). In other words, in accordance with the presently disclosed embodiments, the hierarchical constraint loss function (e.g., Equation 3) may cause the multi-label classification model 206A to always predict the parent class (e.g., "Animal") with a higher probability than that of the child class (e.g., "Dog"). In particular embodiments, the multi-label classification model 206A may then output one or more hierarchically consistent predictions 214.

Figure 2B:
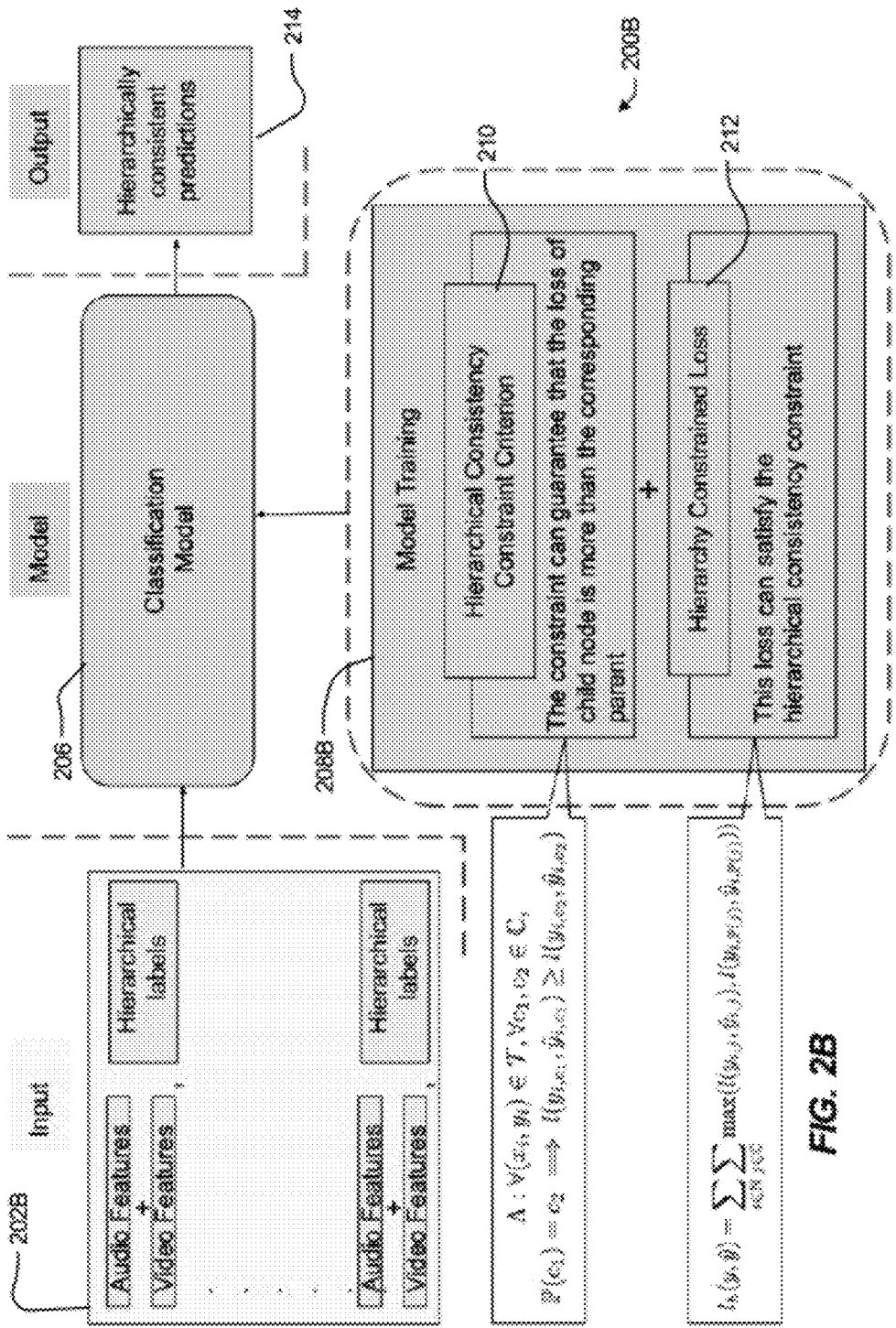
FIG. 2B illustrates another embodiment of a multi-label classification machine-learning model for deriving and utilizing a hierarchical constraint loss function for training a machine-learning model.

FIG. 2B illustrates another embodiment of a multi-label classification machine-learning model 200B for deriving and utilizing a hierarchical constraint loss function for training a machine-learning model to more accurately predict multi-label classifications. In particular embodiments, the multi-label classification machine-learning model 200B may be suitable for training the multi-label classification model 206B based on a database of programming content object features and associated human annotated and pre-labeled data 202B (e.g., ground truth for evaluating the trained the multi-label classification model 206B). For example, in particular embodiments, the multi-label classification model 206B may be trained for hierarchical consistent learning and hierarchical learning curriculum in accordance with the below algorithm:

---
Algorithm 1: Class Selection for Hierarchical Class-Based Curriculum Learning
---

Function selectClasses (Training Data
   $\mathcal{T} = (x_i, y_i)_{i=1,...,N}$, Base Loss l, Threshold thresh)
|   for j = 1 . . . C do
| |   $l_h(y_{.,j}, \hat{y}_{.,j}) \leftarrow 0$;
| |   for i = 1 ... N do
| | |   $l_h(y_{i,j}, \hat{y}_{i,j}) \leftarrow$
| | |     $\max(l(y_{i,j}, \hat{y}_{i,j}), l(y_{i,\mathbb{P}(j)}, \hat{y}_{i,\mathbb{P}(j)}))$;
| |_ |_  $l_h(y_{.,j}, \hat{y}_{.,j}) \mathrel{+}= l_h(y_{i,j}, \hat{y}_{i,j})$;
|   Sort class indices in non-decreasing order of $l_h$;
|   Get minimum K s.t.
|     $\Sigma_{c=1}^{K} l_h(y_{.,c}, \hat{y}_{.,c}) >$ thresh + 1 − K;
|   for i = 1 . . . C do
| |   if i < K then
| | |_ |_  $s_i \leftarrow 1$
|   else
| |_ |_  $s_i \leftarrow 1$
|_ return s

---

For example, in particular embodiments, given a base loss function/as expressed by Equation 1, a hierarchically constrained loss function $l_h$, may be derived as expressed by Equation 3. Indeed, in particular embodiments, the above algorithm first creates a hierarchically constrained loss function $l_h$ given the loss function l. In particular embodiments, the above algorithm may then sort the loss values of classes in increasing order of magnitude. Finally, it selects the first K classes from this list such that the cumulative sum is greater than thresh+1−K, where K is an hyperparameter. In particular embodiments, the first 1−K classes go in the selection pool. In particular embodiments, the time complexity of the above algorithm is O(NC log(C)) and is thus computationally inexpensive due to class size being typically small. In particular embodiments, the above algorithm may further be utilized to find the optimal class-selection parameter 's', e.g., s(i)=1 implies that class i is selected by the algorithm. Once trained, the multi-label classification machine-learning model 200B may proceed in the multi-label classification of programming content objects as previous discussed above with respect to FIG. 2A.

Figure 2C:
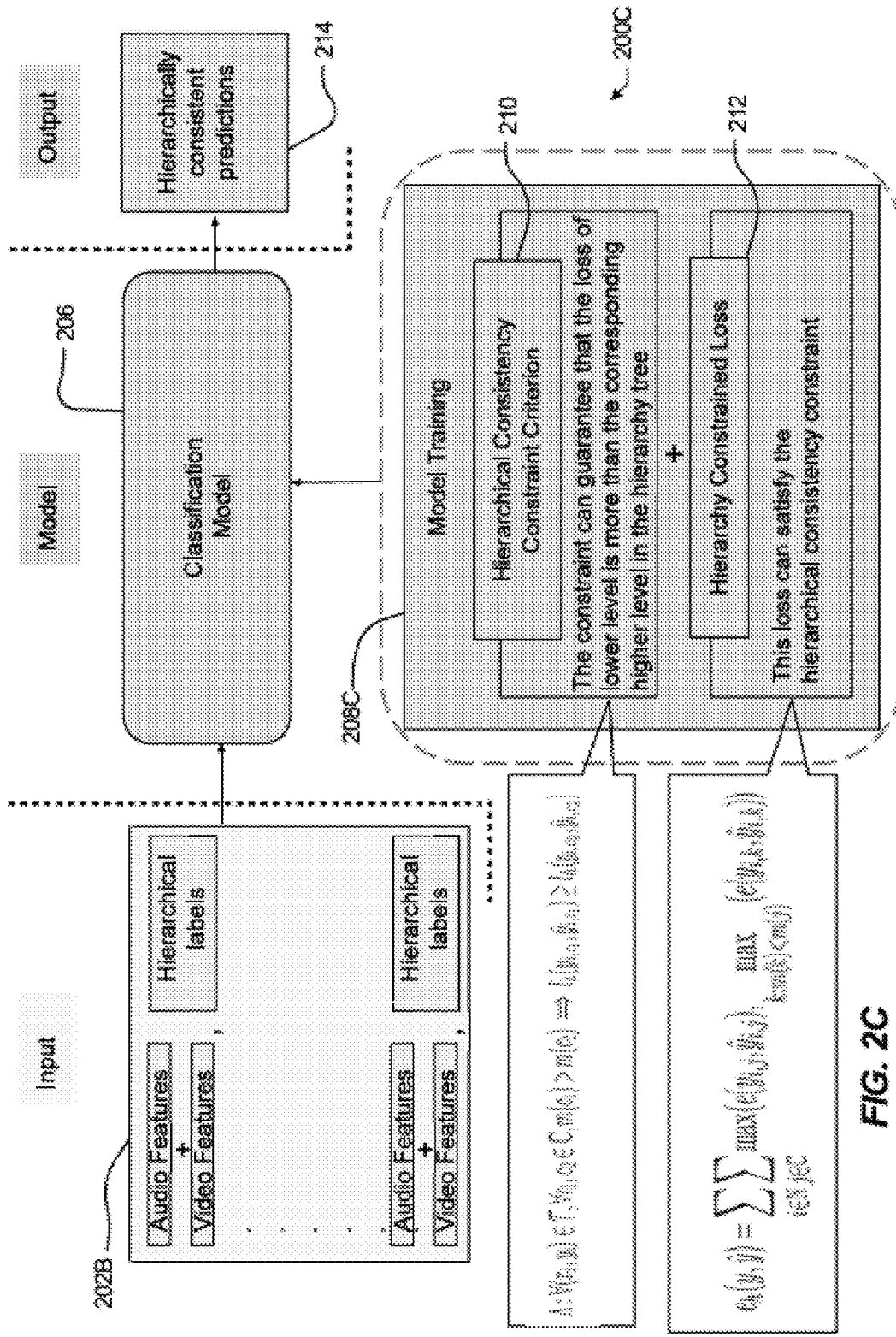
FIG. 2C illustrates another embodiment of a multi-label classification machine-learning model for deriving and utilizing a hierarchical constraint loss function for training a machine-learning model.

FIG. 2C illustrates another embodiment of a multi-label classification machine-learning model 200C for deriving and utilizing a hierarchical constraint loss function for training a machine-learning model to more accurately predict multi-label classifications. In particular embodiments, the multi-label classification machine-learning model 200C may be suitable for deriving a hierarchical consistency constraint criterion to be hierarchical level-based as opposed to the parent-child hierarchical relationship as discussed above with respect to the multi-label classification machine-learning model 200B of FIG. 2A and the multi-label classification machine-learning model 200B of FIG. 2B. For example, in particular embodiments, the multi-label classification machine-learning model 200C may derive hierarchical constraint loss function that may be derived based on one or more hierarchical consistency constraints, which may be expressed as:

$$\Lambda: \forall (x_i, y_i) \in \mathcal{T}, \forall c_1, c_2 \in \mathbf{C}, m(c_1) > m(c_2) \Longrightarrow l_h(y_{i,c_1}, \hat{y}_{i,c_1}) \geq l_h(y_{i,c_2}, \hat{y}_{i,c_1}) \geq l_h(y_{i,c_2}, \hat{y}_{i,c_2})$$

(Equation 4).

In particular embodiments, referring to Equation 4, m denotes a mapping from category c to a corresponding hierarchical level. For example, in particular embodiments, for curriculum learning, the multi-label classification model 206C may more easily identify categories in higher level (closer to the root) than finer categories in the lower level (closer to the leaves) as they are coarser. For example, in particular embodiments, the hierarchical level-based constraint may imply that the loss increases monotonically with each level of the hierarchy. For example, in particular embodiments, in accordance with the multi-label classification model 206C, the loss of higher hierarchical levels in the hierarchy may be lesser than that of the lower hierarchical levels in the hierarchy. In particular embodiments, violations in which the loss of higher hierarchical levels in the hierarchy may not be lesser than that of the lower hierarchical levels in the hierarchy may be interpreted by the multi-label classification model 206C as differentiating between, for example, finer-grained classes more easily as compared to coarse classes. In particular embodiments, based on one or more hierarchical consistency constraints as expressed by Equation 4, the multi-label classification machine-learning model 200C may derive a hierarchical constraint loss function, which may be expressed as:

$$e_h(y, \hat{y}) = \sum_{i \in \mathbb{N}} \sum_{j \in \mathbf{C}} \max\left(e(y_{i,j}, \hat{y}_{i,j}), \max_{k: m(k) < m(j)} (e(y_{i,k}, \hat{y}_{i,k}))\right).$$ (Equation 5)

Figure 3A:
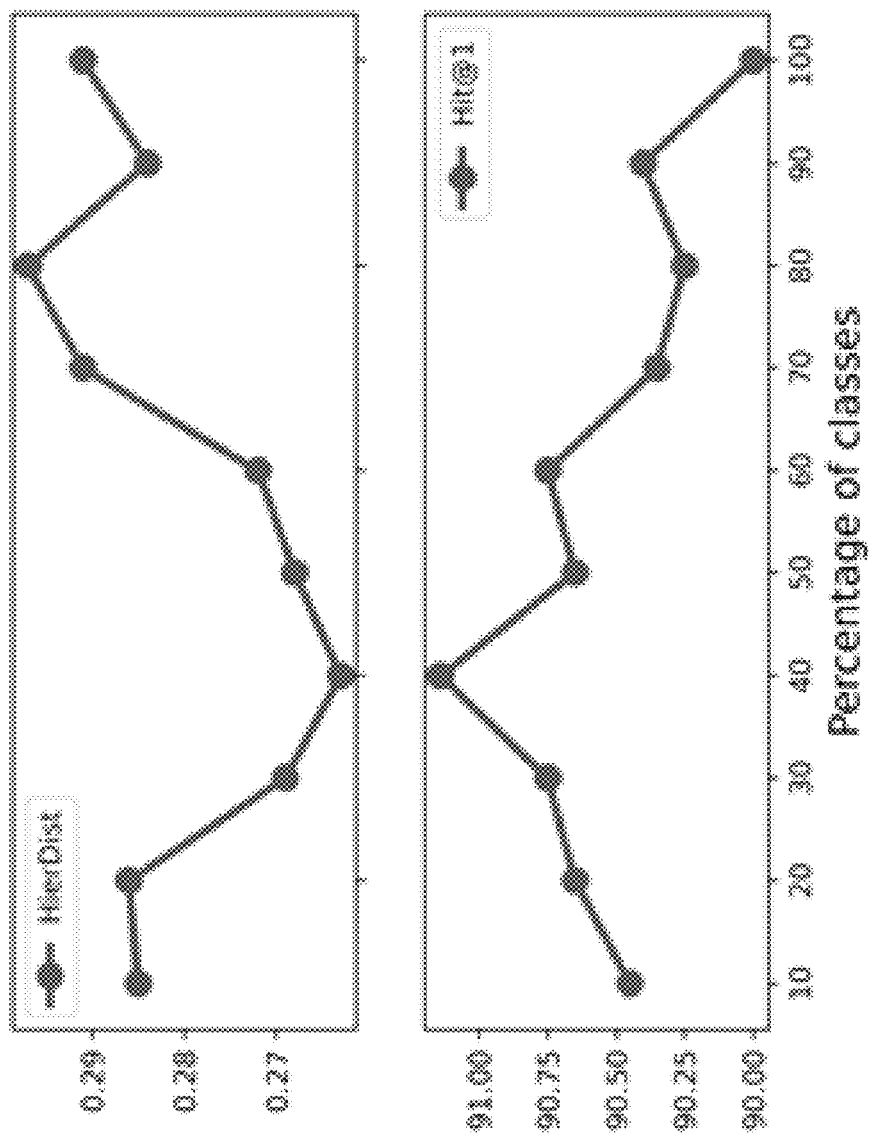
FIG. 3A and FIG. 3B illustrate example evaluation diagrams of the presently disclosed hierarchically constrained loss (HCL) techniques.
Figure 3B:
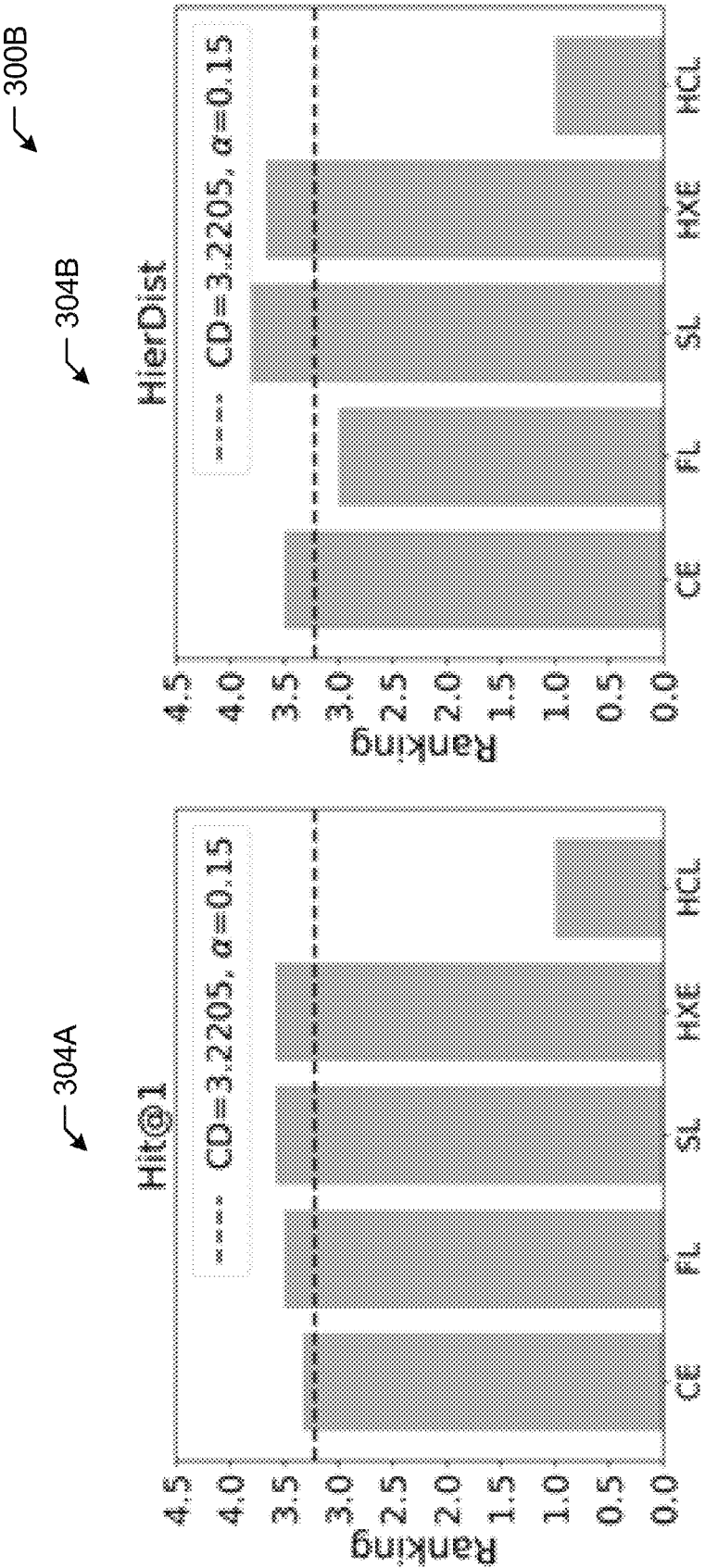

FIG. 3A and FIG. 3B illustrate example evaluation diagrams 300A and 300B of the presently disclosed hierarchically constrained loss (HCL) techniques. As depicted, the appropriate value of the threshold based on the percentage of classes may be selected with the random initialization of the model (e.g., using the $0^{th}$ iteration loss values). As illustrated by FIG. 3A, evaluating the impact of varying the percentage of class-selection by HCL on its performance, it may be observed that both significant metrics, HierDist and Hit@1 change significantly in their performance based on the percentage of classes selected and hence the threshold used for class-selection. In particular embodiments, HierDist is at its best at 0.258 and Hit@1 is at its best at 91.24 at 40% class-selection of a total 47 classes for publicly available IMCLEF image data set. FIG. 3B illustrates the associated statistical graph of the data provided by FIG. 3B. As depicted, the dashed line denotes the sum of ranking of HCL and corresponding critical difference (CD). Further, as illustrated by FIG. 3B, less advanced algorithms above the line are statistically significantly outperformed by the presently disclosed HCL techniques.

Figure 4:
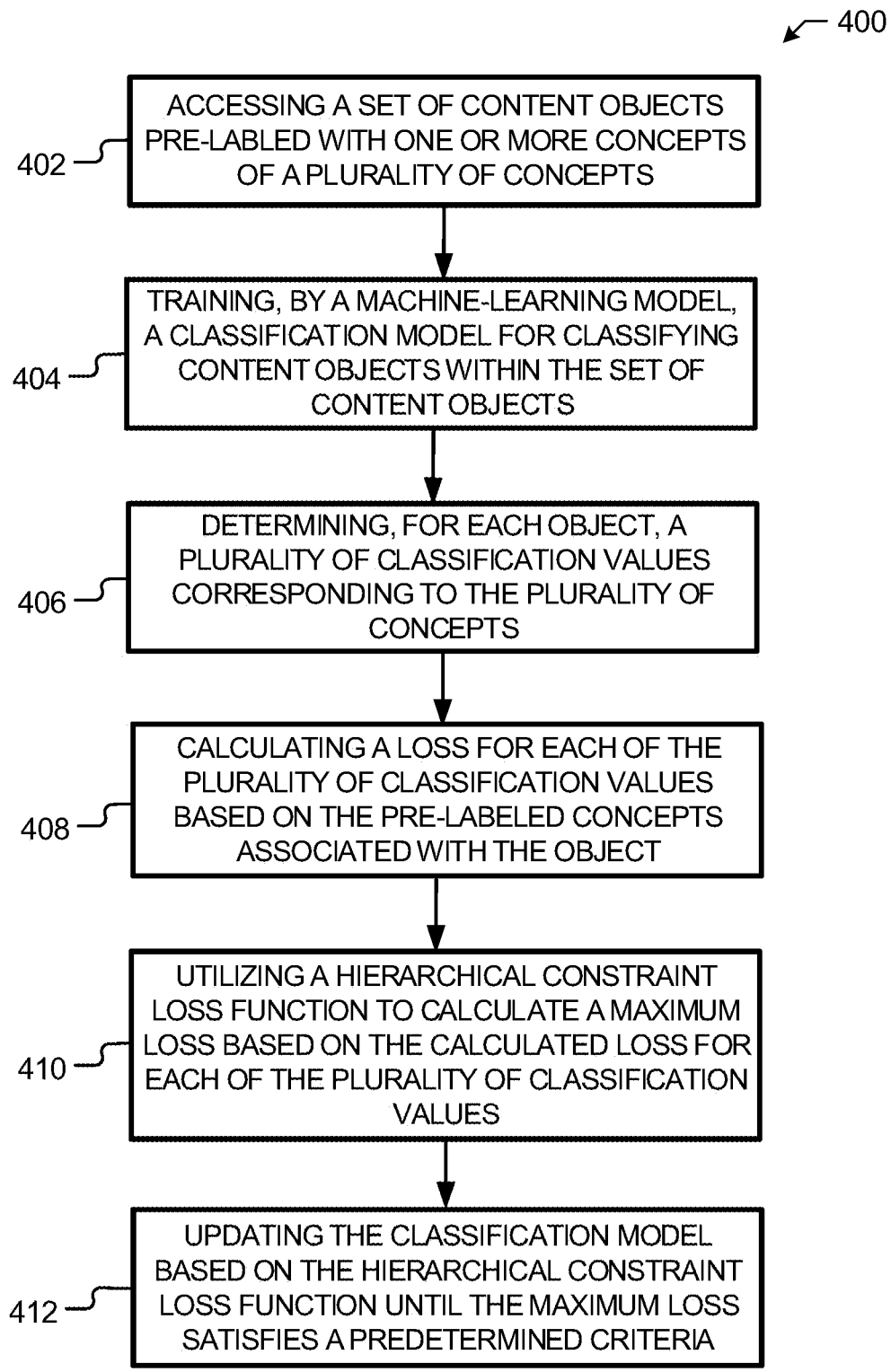
FIG. 4 illustrates a flow diagram of a method for deriving and utilizing a hierarchical constraint loss function for training a machine-learning model to more accurately predict multi-label classifications.

FIG. 4 illustrates a flow diagram of a method 400 for deriving and utilizing a hierarchical constraint loss function for training a machine-learning model to more accurately predict multi-label classifications, in accordance with the presently disclosed embodiments. The method 400 may be performed utilizing one or more processing devices (e.g., programming analytics system 102) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing user viewing content time-series data), software (e.g., instructions running/executing on one or more processors), firmware (e.g., microcode), or some combination thereof.

The method 400 may begin block 402 with the one or more processing devices (e.g., programming analytics system 102) accessing a set of content objects, wherein each content object of the set of content objects is pre-labeled with one or more concepts of a plurality of concepts, and in which the plurality of concepts are organized according to a hierarchical relationship. The method 400 may then continue at block 404 with the one or more processing devices (e.g., programming analytics system 102) training, by a machine-learning model, a classification model for classifying content objects within the set of content objects. The method 400 may then continue at block 406 with the one or more processing devices (e.g., programming analytics system 102) determining, for each object, a plurality of classification values corresponding to the plurality of concepts. The method 400 may then continue at block 408 with the one or more processing devices (e.g., programming analytics system 102) calculating a loss for each of the plurality of classification values based on the pre-labeled concepts associated with the object. The method 400 may then continue at block 410 with the one or more processing devices (e.g., programming analytics system 102) utilizing a hierarchical constraint loss function to calculate a maximum loss based on the calculated loss for each of the plurality of classification values. The method 400 may then conclude at block 412 with the one or more processing devices (e.g., programming analytics system 102) updating the classification model based on the hierarchical constraint loss function until the maximum loss satisfies a predetermined criteria.

Accordingly, as described by the method 400 of FIG. 4, the present embodiments are directed toward a programming analytics system for deriving and utilizing a hierarchical constraint loss function for training a machine-learning model to better predict multi-label classifications. The programming analytics system may access a set of content objects, in which each content object of the set of content objects may be pre-labeled with one or more concepts of a number of concepts. In particular embodiments, the number of concepts may be organized according to a hierarchical relationship. In particular embodiments, the programming analytics system may train, by a machine-learning model, a classification model for classifying content objects within the set of content objects. For example, in particular embodiments, training, by the machine-learning model, the classification model may include training the classification model utilizing content objects of the set of content objects corresponding to the parent concept in accordance with a predetermined criteria prior to utilizing content objects of the set of content objects corresponding to the child concept in accordance with the predetermined criteria.

In particular embodiments, training the classification model may include determining, for each object, a number of classification values corresponding to the plurality of concepts. In particular embodiments, training the classification model may further include calculating a loss for each of the plurality of classification values based on the pre-labeled concepts associated with the object. For example, in particular embodiments, the calculated loss for each of the number of classification value may include a first calculated loss for a parent concept of the number of concepts and a second calculated loss for a child concept of the number of concepts. In particular embodiments, training the classification model may further include utilizing a hierarchical constraint loss function to calculate a maximum loss based on the calculated loss for each of the plurality of classification values. For example, in particular embodiments, the hierarchical constraint loss function may include one or more constraints configured to limit the second calculated loss to a value less than or equal to that of the first calculated loss. In particular embodiments, the hierarchical constraint loss function may also be bounded around one or more values on an interval between 0 and 1. In particular embodiments, prior to utilizing the hierarchical constraint loss function to calculate the maximum loss, the programming analytics system may derive the hierarchical constraint loss function based on one or more base loss functions.

In particular embodiments, subsequent to deriving the hierarchical constraint loss function, the programming analytics system may sort the respective losses for each of the number of classification values in order of increasing loss value and selecting an initial K concepts corresponding to an initial K losses of the sorted respective losses, such that a cumulative sum of the initial K losses is greater than a sum of a predetermined threshold loss value and 1–K. For example, in particular embodiments, K may include a hyperparameter. In particular embodiments, training the classification model may conclude with utilizing updating the classification model based on the hierarchical constraint loss function until the maximum loss satisfies a predetermined criterion. In this way, the present embodiments may provide a hierarchical constraint loss function, which may be utilize, for example, to improve programming content recommendations (e.g., TV programming, video-streaming programming, podcast programming, and so forth) and advertisements (e.g., advertisements that may be interesting to particular users) by suggesting programming content to user based on the current video and user's watch history/profile, providing more coarsely grained programming content categories (e.g., Action, Entertainment), providing more finely grained categories (e.g., Entertainment/Concert, Action/War) can increase accuracy of recommendation, providing better advertisement targeting based on users' watch history or taste graphs, and so forth.

Figure 5:
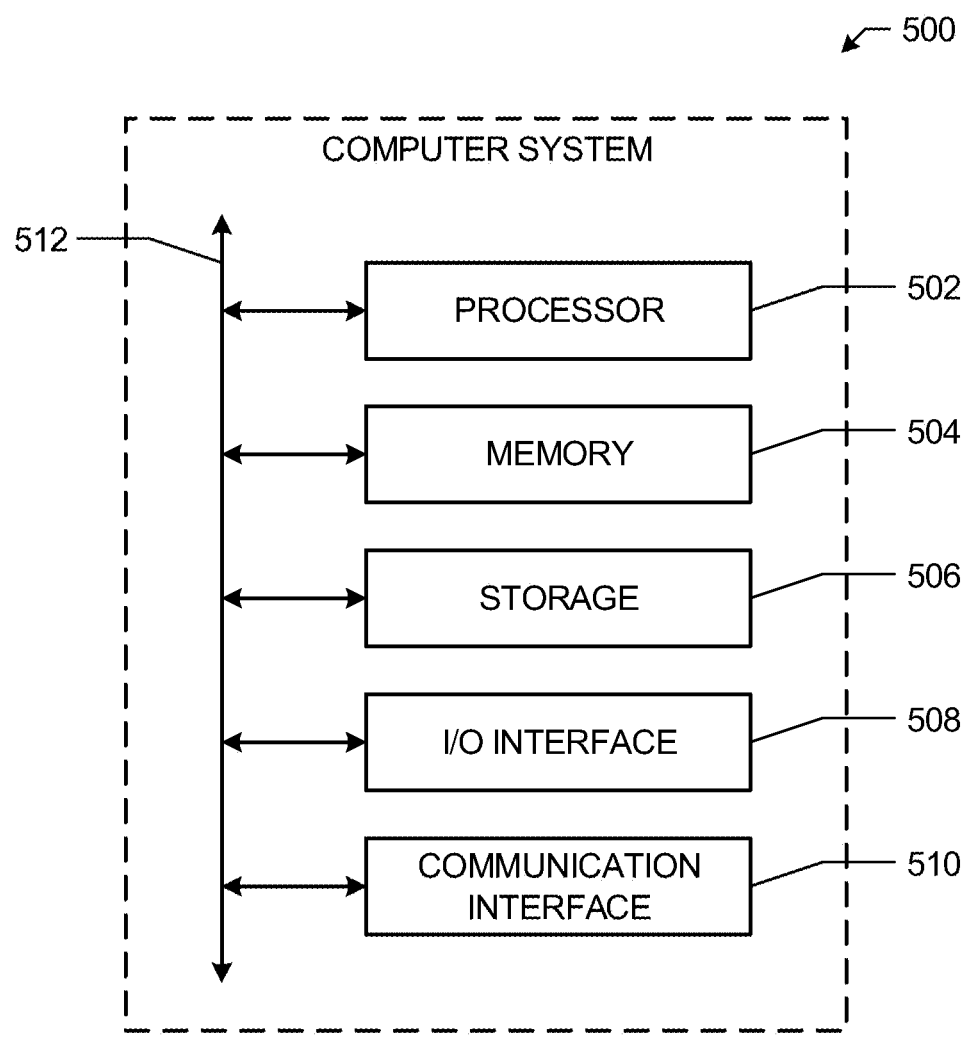
FIG. 5 illustrates an example computer system.

FIG. 5 illustrates an example computer system 500 that may be utilized for deriving and utilizing a hierarchical constraint loss function for training a machine-learning model to more accurately predict multi-label classifications, in accordance with the presently disclosed embodiments. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks.

Where appropriate, one or more computer systems 500 may perform without substantial spatial or temporal limitation one or more steps of one or more methods described or illustrated herein. As an example, and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 810, and a bus 512. Although this disclosure describes and illustrates a particular computer system having a particular number of particular components in a particular arrangement, this disclosure contemplates any suitable computer system having any suitable number of any suitable components in any suitable arrangement. In particular embodiments, processor 502 includes hardware for executing instructions, such as those making up a computer program. As an example, and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example, and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502.

Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs);

be a multi-core processor; or include one or more processors 802. Although this disclosure describes and illustrates a particular processor, this disclosure contemplates any suitable processor.

In particular embodiments, memory 504 includes main memory for storing instructions for processor 502 to execute or data for processor 502 to operate on. As an example, and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere).

One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memory devices 504, where appropriate. Although this disclosure describes and illustrates particular memory, this disclosure contemplates any suitable memory.

In particular embodiments, storage 506 includes mass storage for data or instructions. As an example, and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 506 for them. Where appropriate, I/O interface 508 may include one or more device or software drivers enabling processor 502 to drive one or more of these I/O devices. I/O interface 508 may include one or more I/O interfaces 506, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 500 and one or more other computer systems 500 or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it.

As an example, and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 512 includes hardware, software, or both coupling components of computer system 500 to each other. As an example, and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Figure 6:
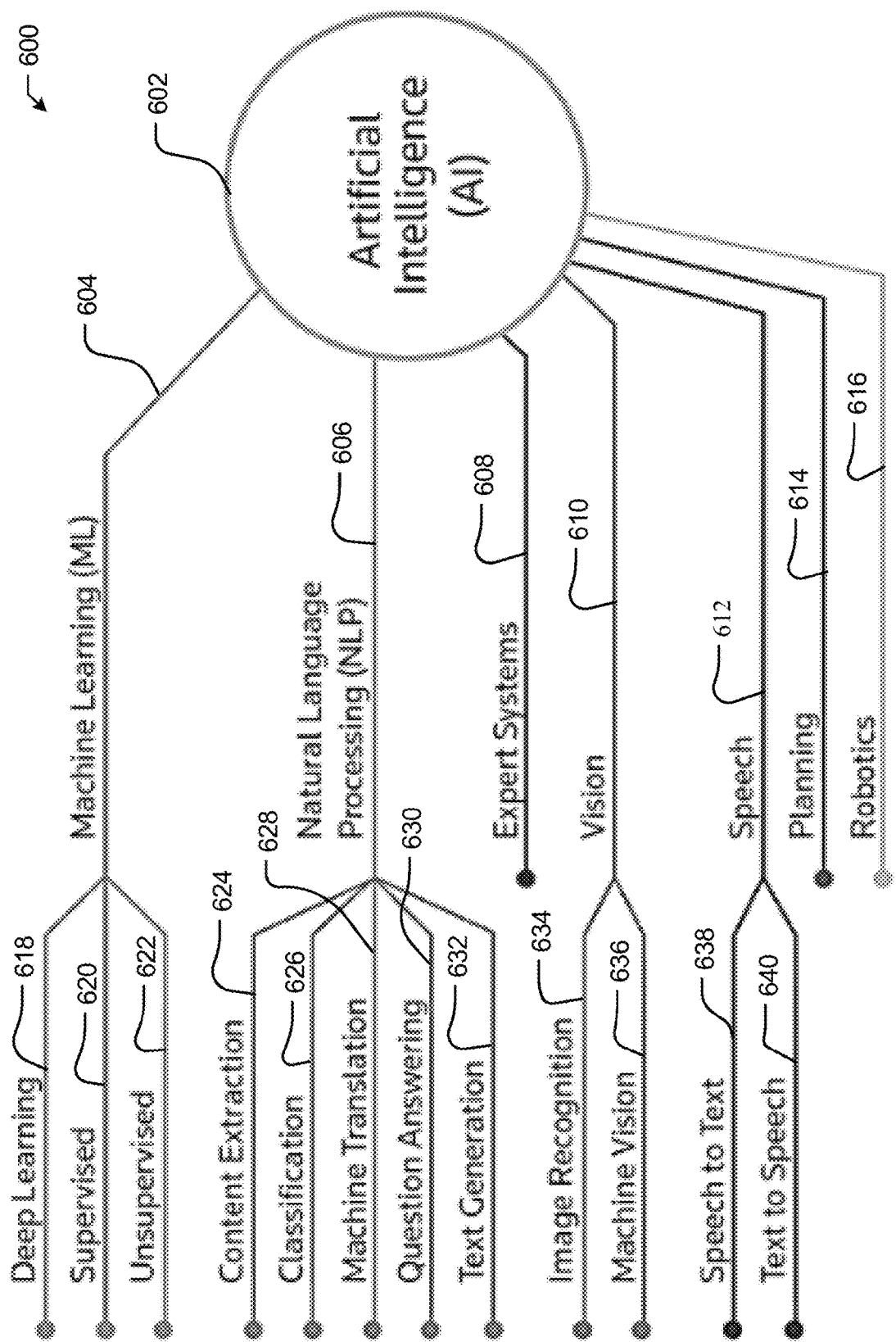
FIG. 6 illustrates a diagram of an example artificial intelligence (AI) architecture.

FIG. 6 illustrates a diagram 600 of an example artificial intelligence (AI) architecture 602 that may be utilized for deriving and utilizing a hierarchical constraint loss function for training a machine-learning model to more accurately predict multi-label classifications, in accordance with the presently disclosed embodiments. In particular embodiments, the AI architecture 602 may be implemented utilizing, for example, one or more processing devices that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), and/or other processing device(s) that may be suitable for processing various data and making one or more decisions based thereon), software (e.g., instructions running/executing on one or more processing devices), firmware (e.g., microcode), or some combination thereof.

In particular embodiments, as depicted by FIG. 6, the AI architecture 602 may include machine leaning (ML) algorithms and functions 604, natural language processing (NLP) algorithms and functions 606, expert systems 608, computer-based vision algorithms and functions 610, speech recognition algorithms and functions 612, planning algorithms and functions 614, and robotics algorithms and functions 616. In particular embodiments, the ML algorithms and functions 604 may include any statistics-based algorithms that may be suitable for finding patterns across large amounts of data (e.g., "Big Data" such as user click data or other user interactions, text data, image data, video data, audio data, speech data, numbers data, and so forth). For example, in particular embodiments, the ML algorithms and functions 604 may include deep learning algorithms 618, supervised learning algorithms 620, and unsupervised learning algorithms 622.

In particular embodiments, the deep learning algorithms 618 may include any artificial neural networks (ANNs) that may be utilized to learn deep levels of representations and abstractions from large amounts of data. For example, the deep learning algorithms 618 may include ANNs, such as a multilayer perceptron (MLP), an autoencoder (AE), a convolution neural network (CNN), a recurrent neural network (RNN), long short term memory (LSTM), a grated recurrent unit (GRU), a restricted Boltzmann Machine (RBM), a deep belief network (DBN), a bidirectional recurrent deep neural network (BRDNN), a generative adversarial network (GAN), and deep Q-networks, a neural autoregressive distribution estimation (NADE), an adversarial network (AN), attentional models (AM), deep reinforcement learning, and so forth.

In particular embodiments, the supervised learning algorithms 620 may include any algorithms that may be utilized to apply, for example, what has been learned in the past to new data using labeled examples for predicting future events. For example, starting from the analysis of a known training dataset, the supervised learning algorithms 620 may produce an inferred function to make predictions about the output values. The supervised learning algorithms 620 can also compare its output with the correct and intended output and find errors in order to modify the supervised learning algorithms 620 accordingly. On the other hand, the unsupervised learning algorithms 622 may include any algorithms that may applied, for example, when the data used to train the unsupervised learning algorithms 622 are neither classified nor labeled. For example, the unsupervised learning algorithms 622 may study and analyze how systems may infer a function to describe a hidden structure from unlabeled data.

In particular embodiments, the NLP algorithms and functions 606 may include any algorithms or functions that may be suitable for automatically manipulating natural language, such as speech and/or text. For example, in some embodiments, the NLP algorithms and functions 606 may include content extraction algorithms or functions 624, classification algorithms or functions 626, machine translation algorithms or functions 628, question answering (QA) algorithms or functions 630, and text generation algorithms or functions 632. In particular embodiments, the content extraction algorithms or functions 624 may include a means for extracting text or images from electronic documents (e.g., webpages, text editor documents, and so forth) to be utilized, for example, in other applications.

In particular embodiments, the classification algorithms or functions 626 may include any algorithms that may utilize a supervised learning model (e.g., logistic regression, naïve Bayes, stochastic gradient descent (SGD), k-nearest neighbors, decision trees, random forests, support vector machine (SVM), and so forth) to learn from the data input to the supervised learning model and to make new observations or classifications based thereon. The machine translation algorithms or functions 628 may include any algorithms or functions that may be suitable for automatically converting source text in one language, for example, into text in another language. The QA algorithms or functions 630 may include any algorithms or functions that may be suitable for automatically answering questions posed by humans in, for example, a natural language, such as that performed by voice-controlled personal assistant devices. The text generation algorithms or functions 632 may include any algorithms or functions that may be suitable for automatically generating natural language texts.

In particular embodiments, the expert systems 608 may include any algorithms or functions that may be suitable for simulating the judgment and behavior of a human or an organization that has expert knowledge and experience in a particular field (e.g., stock trading, medicine, sports statistics, and so forth). The computer-based vision algorithms and functions 610 may include any algorithms or functions that may be suitable for automatically extracting information from images (e.g., photo images, video images). For example, the computer-based vision algorithms and functions 610 may include image recognition algorithms 634 and machine vision algorithms 636. The image recognition algorithms 634 may include any algorithms that may be suitable for automatically identifying and/or classifying objects, places, people, and so forth that may be included in, for example, one or more image frames or other displayed data. The machine vision algorithms 636 may include any algorithms that may be suitable for allowing computers to "see", or, for example, to rely on image sensors cameras with specialized optics to acquire images for processing, analyzing, and/or measuring various data characteristics for decision making purposes.

In particular embodiments, the speech recognition algorithms and functions 612 may include any algorithms or functions that may be suitable for recognizing and translating spoken language into text, such as through automatic speech recognition (ASR), computer speech recognition, speech-to-text (STT), or text-to-speech (TTS) in order for the computing to communicate via speech with one or more users, for example. In particular embodiments, the planning algorithms and functions 614 may include any algorithms or functions that may be suitable for generating a sequence of actions, in which each action may include its own set of preconditions to be satisfied before performing the action. Examples of AI planning may include classical planning, reduction to other problems, temporal planning, probabilistic planning, preference-based planning, conditional planning, and so forth. Lastly, the robotics algorithms and functions 616 may include any algorithms, functions, or systems that may enable one or more devices to replicate human behavior through, for example, motions, gestures, performance tasks, decision-making, emotions, and so forth.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to this disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:

accessing a set of content objects, wherein each content object of the set of content objects is pre-labeled with one or more concepts of a plurality of concepts, and wherein the plurality of concepts are organized according to a hierarchical relationship; and training, by a machine-learning model, a classification model for classifying content objects within the set of content objects, wherein training the classification model comprises:

determining, for each object in the set of content objects, a plurality of classification values corresponding to the plurality of concepts, each classification value corresponding to a different layer in the hierarchical relationship;

calculating, for each object and based on a loss function, a loss for each of the plurality of classification values based on the pre-labeled concepts associated with the object;

training the classification model to predict, for any particular content object, a probability of a class higher in the hierarchical relationship that is less than or equal to a probability of a class lower in the hierarchical relationship by:

generating a hierarchical constraint loss function for the set of content objects by setting the loss for each classification value, for each object, to be the maximum of (1) the calculated loss for the classification value and corresponding pre-labeled concept and (2) a loss corresponding to a classification value in a higher, parent layer of the hierarchical relationship and a corresponding pre-labeled concept for that classification value; and training the classification model using the generated hierarchical constraint loss function as the loss function for the classification model; and updating the classification model based on the hierarchical constraint loss function until the maximum loss satisfies a predetermined criterion.

2. The method of claim 1, wherein the calculated loss for each of the plurality of classification values comprises a first calculated loss for a parent concept of the plurality of concepts and a second calculated loss for a child concept of the plurality of concepts.

3. The method of claim 2, wherein the hierarchical constraint loss function comprises one or more constraints configured to limit the second calculated loss to a value less than or equal to that of the first calculated loss.

4. The method of claim 2, wherein the hierarchical constraint loss function is bounded around a 0-1 loss function.

5. The method of claim 2, wherein training, by the machine-learning model, the classification model comprises training the classification model utilizing content objects of the set of content objects corresponding to the parent concept in accordance with the predetermined criteria prior to utilizing content objects of the set of content objects corresponding to the child concept in accordance with the predetermined criteria.

6. The method of claim 1, further comprising:
   prior to utilizing the hierarchical constraint loss function to calculate the maximum loss, deriving the hierarchical constraint loss function based on one or more base loss functions.

7. The method of claim 6, wherein, subsequent to deriving the hierarchical constraint loss function, the method further comprising:
   sorting the respective losses for each of the plurality of classification values in order of increasing loss value; and
   selecting an initial K concepts corresponding to an initial K losses of the sorted respective losses, such that a cumulative sum of the initial K losses is greater than a sum of a predetermined threshold loss value and 1-K, wherein K is a hyperparameter.

8. One or more computing devices, comprising:
   one or more non-transitory computer-readable storage media including instructions; and
   one or more processors coupled to the one or more storage media, the one or more processors configured to execute the instructions to:
      access a set of content objects, wherein each content object is pre-labeled with one or more concepts of a plurality of concepts, and wherein the plurality of concepts are organized according to a hierarchical relationship; and
      train, by a machine-learning model, a classification model for classifying content objects within the set of content objects, wherein training the classification model comprises:
         determine, for each object in the set of content objects, a plurality of classification values corresponding to the plurality of concepts, each classification value corresponding to a different layer in the hierarchical relationship;
         calculate for each object and based on a loss function, a loss for each of the plurality of classification values based on the pre-labeled concepts associated with the object;
         train the classification model to predict, for any particular content object, a probability of a class higher in the hierarchical relationship that is less than or equal to a probability of a class lower in the hierarchical relationship by:
            generating a hierarchical constraint loss function for the set of content objects by setting the loss for each classification value, for each object, to be the maximum of (1) the calculated loss for the classification value and corresponding pre-labeled concept and (2) a loss corresponding to a classification value in a higher, parent layer of the hierarchical relationship and a corresponding pre-labeled concept for that classification value; and
            training the classification model using the generated hierarchical constraint loss function as the loss function for the classification model; and
         update the classification model based on the hierarchical constraint loss function until the maximum loss satisfies a predetermined criterion.

9. The one or more computing devices of claim 8, wherein the calculated loss for each of the plurality of classification values comprises a first calculated loss for a parent concept of the plurality of concepts and a second calculated loss for a child concept of the plurality of concepts.

10. The one or more computing devices of claim 9, wherein the hierarchical constraint loss function comprises one or more constraints configured to limit the second calculated loss to a value less than or equal to that of the first calculated loss.

11. The one or more computing devices of claim 9, wherein the hierarchical constraint loss function is bounded around a 0-1 loss function.

12. The one or more computing devices of claim 9, wherein the instructions to train, by the machine-learning model, the classification model further comprises instructions to train the classification model utilizing content objects of the set of content objects corresponding to the parent concept in accordance with the predetermined criteria prior to utilizing content objects of the set of content objects corresponding to the child concept in accordance with the predetermined criteria.

13. The one or more computing devices of claim 8, wherein, prior to utilizing the hierarchical constraint loss function to calculate the maximum loss, the instructions further comprises instructions to:
   derive the hierarchical constraint loss function based on one or more base loss functions.

14. The one or more computing devices of claim 13, wherein, subsequent to deriving the hierarchical constraint loss function, the instructions further comprises instructions to:
   sort the respective losses for each of the plurality of classification values in order of increasing loss value; and
   select an initial K concepts corresponding to an initial K losses of the sorted respective losses, such that a cumulative sum of the initial K losses is greater than a sum of a predetermined threshold loss value and 1−K, wherein K is a hyperparameter.

15. A non-transitory computer-readable medium comprising instructions that, when executed by one or more processors of one or more computing devices, cause the one or more processors to:
   access a set of content objects, wherein each content object is pre-labeled with one or more concepts of a plurality of concepts, and wherein the plurality of concepts are organized according to a hierarchical relationship; and
   train, by a machine-learning model, a classification model for classifying content objects within the set of content objects, wherein training the classification model comprises:
      determine, for each object in the set of content objects, a plurality of classification values corresponding to the plurality of concepts, each classification value corresponding to a different layer in the hierarchical relationship;

calculate for each object and based on a loss function, a loss for each of the plurality of classification values based on the pre-labeled concepts associated with the object;

train the classification model to predict, for any particular content object, a probability of a class higher in the hierarchical relationship that is less than or equal to a probability of a class lower in the hierarchical relationship by:

generating a hierarchical constraint loss function for the set of content objects by setting the loss for each classification value, for each object, to be the maximum of (1) the calculated loss for the classification value and corresponding pre-labeled concept and (2) a loss corresponding to a classification value in a higher, parent layer of the hierarchical relationship and a corresponding pre-labeled concept for that classification value; and training the classification model using the generated hierarchical constraint loss function as the loss function for the classification model; and update the classification model based on the hierarchical constraint loss function until the maximum loss satisfies a predetermined criterion.

16. The non-transitory computer-readable medium of claim 15, wherein the calculated loss for each of the plurality of classification values comprises a first calculated loss for a parent concept of the plurality of concepts and a second calculated loss for a child concept of the plurality of concepts.

17. The non-transitory computer-readable medium of claim 16, wherein the hierarchical constraint loss function comprises one or more constraints configured to limit the second calculated loss to a value less than or equal to that of the first calculated loss.

18. The non-transitory computer-readable medium of claim 16, wherein the hierarchical constraint loss function is bounded around a 0-1 loss function.

19. The non-transitory computer-readable medium of claim 15, wherein, prior to utilizing the hierarchical constraint loss function to calculate the maximum loss, the instructions further comprises instructions to:

derive the hierarchical constraint loss function based on one or more base loss functions.

20. The non-transitory computer-readable medium of claim 19, wherein, subsequent to deriving the hierarchical constraint loss function, the instructions further comprises instructions to:

sort the respective losses for each of the plurality of classification values in order of increasing loss value; and select an initial K concepts corresponding to an initial K losses of the sorted respective losses, such that a cumulative sum of the initial K losses is greater than a sum of a predetermined threshold loss value and 1−K, wherein K is a hyperparameter.

* * * * *